(12) United States Patent
Tomar et al.

(10) Patent No.: US 10,878,807 B2
(45) Date of Patent: Dec. 29, 2020

(54) SYSTEM AND METHOD FOR IMPLEMENTING A VOCAL USER INTERFACE BY COMBINING A SPEECH TO TEXT SYSTEM AND A SPEECH TO INTENT SYSTEM

(71) Applicant: Fluent.AI Inc., Montreal (CA)

(72) Inventors: Vikrant Tomar, Montreal (CA); Mathieu Desruisseaux, Montreal (CA); Helge Seetzen, Montreal (CA)

(73) Assignee: FLuent.AI Inc., Montreal (CA)

( * ) Notice: Subject to any disclaimer, the term of this patent is extended or adjusted under 35 U.S.C. 154(b) by 1 day.

(21) Appl. No.: 15/780,576

(22) PCT Filed: Dec. 1, 2015

(86) PCT No.: PCT/CA2015/051257
§ 371 (c)(1),
(2) Date: Jun. 1, 2018

(87) PCT Pub. No.: WO2017/091883
PCT Pub. Date: Jun. 8, 2017

(65) Prior Publication Data
US 2018/0358005 A1    Dec. 13, 2018

(51) Int. Cl.
*G10L 15/18*    (2013.01)
*G10L 15/22*    (2006.01)
(Continued)

(52) U.S. Cl.
CPC .......... *G10L 15/1815* (2013.01); *G06F 3/167* (2013.01); *G06F 40/247* (2020.01);
(Continued)

(58) Field of Classification Search
CPC ... G10L 15/1815; G10L 15/22; G10L 15/142; G10L 15/16; G10L 2015/223; G06F 17/2795
See application file for complete search history.

(56) References Cited

U.S. PATENT DOCUMENTS

| | | | |
|---|---|---|---|
| 7,562,014 B1 | 7/2009 | Hakkani-Tur et al. | |
| 2006/0149544 A1* | 7/2006 | Hakkani-Tur | G10L 15/22 704/236 |

(Continued)

FOREIGN PATENT DOCUMENTS

WO    2009145796 A1    12/2009

OTHER PUBLICATIONS

L. R. Rabiner, "A tutorial on hidden Markov models and selected applications in speech recognition," in Proceedings of the IEEE, vol. 77, No. 2, pp. 257-286, Feb. 1989.

(Continued)

*Primary Examiner* — Nafiz E Hoque
(74) *Attorney, Agent, or Firm* — Straub & Straub; Michael P. Straub; Stephen T. Straub

(57) ABSTRACT

The present disclosure relates to speech recognition systems and methods that enable personalized vocal user interfaces. More specifically, the present disclosure relates to combining a self-learning speech recognition system based on semantics with a speech-to-text system optionally integrated with a natural language processing system. The combined system has the advantage of automatically and continually training the semantics-based speech recognition system and increasing recognition accuracy.

19 Claims, 6 Drawing Sheets

(51) Int. Cl.
   G10L 15/02      (2006.01)
   G10L 15/197     (2013.01)
   G06F 3/16       (2006.01)
   G06N 3/04       (2006.01)
   G06N 7/00       (2006.01)
   G06N 20/10      (2019.01)
   G06F 40/30      (2020.01)
   G06F 40/247     (2020.01)
   G10L 25/51      (2013.01)
   G10L 15/14      (2006.01)
   G10L 15/16      (2006.01)

(52) U.S. Cl.
   CPC ......... *G06F 40/30* (2020.01); *G06N 3/0445* (2013.01); *G06N 3/0454* (2013.01); *G06N 7/005* (2013.01); *G06N 20/10* (2019.01); *G10L 15/02* (2013.01); *G10L 15/197* (2013.01); *G10L 15/22* (2013.01); *G10L 15/142* (2013.01); *G10L 15/16* (2013.01); *G10L 25/51* (2013.01); *G10L 2015/223* (2013.01)

(56) References Cited

U.S. PATENT DOCUMENTS

| | | | | |
|---|---|---|---|---|
| 2011/0111741 A1* | 5/2011 | Connors | ......... | H04W 4/08 455/414.3 |
| 2015/0063575 A1 | 3/2015 | Tan | | |
| 2016/0148610 A1* | 5/2016 | Kennewick, Jr. | ....... | G10L 15/18 704/240 |

OTHER PUBLICATIONS

L. Pérez, "Hidden Markov Models and the Baum-Welch Algorithm," in IEEE Information Theory Society Newsletter, vol. 53, No. 4, Dec. 2003.

N. Jaitly, et al, "Application of Pretrained Deep Neural Networks to Large Vocabulary Speech Recognition," in INTERSPEECH, 2012.

V. Tomar and R. Rose, "Graph based manifold regularized deep neural networks for automatic speech recognition," CoRR abs/1606.05925, 2016.

Y. Bengio, et al., "Greedy layer-wise training of deep networks," in Proceedings of the 19th International Conference on Neural Information Processing Systems, MIT Press, Cambridge, MA, USA, pp. 153-160, 2006.

D. Yu, et al., "Conversational Speech Transcription Using Context-Dependent Deep Neural Networks," ICML 2011.

M. Bhargava and R. Rose, "Architectures for Deep Neural Network Based Acoustic Models Defined Over Windowed Speech Waveforms," in INTERSPEECH, 2015.

T. N. Sainath, et al., "Deep Convolutional Neural Networks for Large-scale Speech Tasks," Neural networks: the official journal of the International Neural Network Society, pp. 39-48, 2014.

H. Sak, et al., "Fast and Accurate Recurrent Neural Network Acoustic Models for Speech Recognition," in INTERSPEECH, 2015.

A. Senior, et al., "Context dependent phone models for LSTM RNN acoustic modelling," 2015 IEEE International Conference on Acoustics, Speech and Signal Processing (ICASSP), pp. 4585-4589, 2015.

T. Sercu, et al., "Very deep multilingual convolutional neural networks for LVCSR," 2016 IEEE International Conference on Acoustics, Speech and Signal Processing (ICASSP), pp. 4955-4959, 2016.

T. N. Sainath, et al., "Convolutional, Long Short-Term Memory, fully connected Deep Neural Networks," 2015 IEEE International Conference on Acoustics, Speech and Signal Processing (ICASSP), pp. 4580-4584, 2015.

A. Graves and N. Jaitly, "Towards End-To-End Speech Recognition with Recurrent Neural Networks," ICML, 2014.

J. Chorowski, et al, "End-to-end Continuous Speech Recognition using Attention-based Recurrent NN: First Results," CoRR, abs/1412.1602, 2014.

J. Chung, et al., "Gated Feedback Recurrent Neural Networks," ICML, 2015.

G. Chen, et al., "Query-by-example keyword spotting using long short-term memory networks," 2015 IEEE International Conference on Acoustics, Speech and Signal Processing (ICASSP), pp. 5236-5240, 2015.

J. Driesen and H. Van Hamme, "Modelling vocabulary acquisition, adaptation and generalization in infants using adaptive Bayesian PLSA," Neurocomputing, pp. 1874-1882, 2011.

D. D. Lee and H S. Seung, "Learning the parts of objects by non-negative matrix factorization," Nature—International Journal of Science, vol. 401, pp. 788-791, 1999.

J. Driesen, "Discovering Words in Speech Using Matrix Factorization," KU Leuven, 2012.

B. Ons, et al., "The Self-taught Vocal Interface," 2014 4th Joint Workshop on Hands-free Speech Communication and Microphone Arrays (HSCMA), pp. 21-22, 2014.

B. Ons, "The Self-taught Speech Interface," KU Leuven, 2015.

B. Ons, et al., "Fast vocabulary acquisition in an NMF-based self-learning vocal user interface," Computer Speech & Language, vol. 28, pp. 997-1017, 2014.

L. Broekx, et al., "Comparing and combining classifiers for self-taught vocal interfaces," SLPAT, 2013.

X. Huang, A. Acero, and H.-W, "Spoken Language Processing," 1st edition. Prentice Hall, PTR, 2001, pp. 383-385.

N. Gupta, et al., "The AT&T Spoken Language Understanding System," 2006 IEEE Transactions on Audio, Speech, and Language Processing, vol. 14, No. 1, 2006.

H. Alshawi, "Effective Utterance Classification with Unsupervised Phonotactic Models" Proceedings of HLT-NAACL 2003, Main Papers, pp. 1-7, Edmonton, May-Jun. 2003.

Extended European Search Report for European Patent Application No. 15909433.3, pp. 1-11, dated Jun. 26, 2019.

\* cited by examiner

SYSTEM AND METHOD FOR IMPLEMENTING A VOCAL USER INTERFACE BY COMBINING A SPEECH TO TEXT SYSTEM AND A SPEECH TO INTENT SYSTEM

TECHNICAL FIELD

The following relates to systems and methods for implementing a vocal user interface by combining a speech to text system and a speech to intent system.

DESCRIPTION OF THE RELATED ART

Typically, vocal user interface (VUI) systems involve a two-step process, wherein an ASR (automatic speech recognition: speech to text) module is used in conjunction with an NLU (natural language understanding: text to meaning) module. Conventionally, ASR systems are based on a combination of Gaussian mixture models (GMM) and hidden Markov models (HMM) (see for example refs. [1], [2]). With the advent of deep learning in recent years, the state of the art has shifted to various deep neural networks (DNN) based architectures (see for example refs. [3]-[7]).

The most common example of these systems is the hybrid DNN-HMM architecture, where a DNN is combined with an HMM (see for example refs. [3], [4], [8]). Other examples include convolutional neural networks (CNN), time delay neural networks (TDNN) and recurrent neural networks (RNN) based architectures such as the ones using long-short term memory ((LSTM) and gated recurrent units (GRUs) (see for example refs. [9]-[16]). Despite their numerous advantages over the conventional systems, these new ASR systems have been found to suffer from a number of issues. In particular, the need for training on very large speech datasets, typically on the order of thousands of hours of speech (see for example ref. [3]). Due to this limitation, these systems are typically not suitable to be deployed in low-resource scenarios. That is, either cases where enough labeled speech data is not available for training, or cases where a high degree of personalization is required by the target user and the user, has been found to not provide a suitable number of examples. This is also true in the case where the user might be suffering from a particular speech disorder because of which the conventional deep learning or other ASR systems may not be applicable.

A majority of languages in the world can be considered as low-resource languages with a lot of peculiarities in phonology, word segmentation, reliance on pitch, and morphology. Furthermore, a high degree of variations exists in pronunciations among populations speaking the same language. These issues limit the usability of ASR systems to a small percentage of population. In addition, these approaches are relatively computationally expensive because of the ASR system. Furthermore, the keywords, commands or phrases that can be used with the VUI using these ASR models are limited to the words that are already defined in the ASR system's vocabulary. Thus the use of these general purpose systems makes the experience less personal and dependent on the language.

At the same time, there exist techniques that perform speech recognition independent of text. Examples of these techniques include waveform matching techniques such as dynamic time warping (DTW) (see for example ref. [17]) and query-by-example-based techniques (see for example ref. [18]). These techniques offer the advantage of language-independent learning directly from user examples.

Self-learning systems (i.e. systems configured to learn by query or by example) have also been developed for modeling language acquisition in a manner similar to that by humans (see for example ref. [19]). Examples of these techniques include "learning by parts" techniques such as those based on non-negative matrix factorization (NMF) (see for example refs. [20], [21]). The same system can also be extended to VUIs (see for example ref. [22]).

In the framework of human language acquisition models, learning of keywords and mapping to semantic concepts has been described in, for example, refs. [19], [22]-[25]. These techniques provide two main advantages over the ASR systems. The first is that these techniques are able to directly learn from few examples provided by the end user thus making it easy to personalize the resultant VUI. The second is that most of these techniques can be independent of language. However, they still require the user to provide sufficient examples of all possible commands. It may not be practical for an end-user to provide sufficient examples of all possible commands.

It is an object of the following to obviate or mitigate at least one of the foregoing issues.

SUMMARY

The following provides a speech recognition system and methods implemented thereby, that enable personalized VUIs. In at least one implementation, the system is configured for combining a self-learning speech recognition system based on semantics with a speech-to-text system optionally integrated with a natural language processing system. The combined system has the advantage of automatically and continually training the semantics-based speech recognition system and increasing recognition accuracy.

In one aspect, there is provided a method for performing speech recognition, the method comprising: obtaining an input acoustic signal; providing the input acoustic signal to a speech-to-intent (STI) system to determine a predicted intent, and to a speech-to-text automatic speech recognition (ASR) system to determine predicted text; and using at least one of the predicted intent and the predicted text to map the acoustic signal to one of a set of predefined actions.

In other aspects, there are provided computer readable media and systems configured for performing the above method. In at least one implementation of the system, the system comprises a cloud-based device for performing cloud-based processing. An electronic device is also provides, which comprises an acoustic sensor for receiving acoustic signals, an implementation of the system, and an interface with the system to perform the action when the mapping is successful.

BRIEF DESCRIPTION OF THE DRAWINGS

Embodiments will now be described by way of example only with reference to the appended drawings wherein.

DETAILED DESCRIPTION

Figure 1:
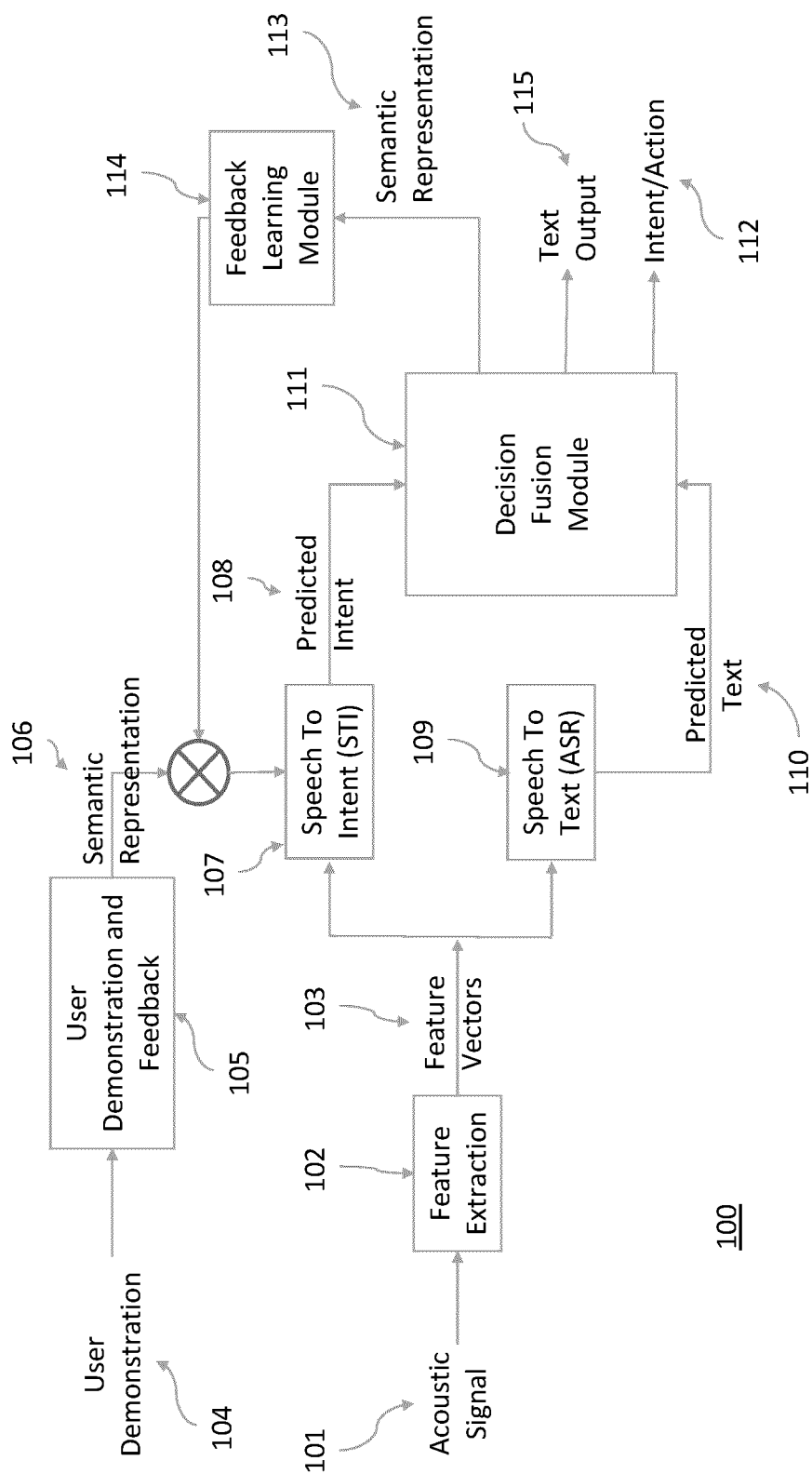
FIG. 1 is a flowchart illustrating operations that can be performed in implementing a combined VUI for speech recognition.

The present disclosure relates to a system that integrates an STI system with an ASR system, and provides a technique to achieve this combination. The resultant system can maintain a very high accuracy for acoustic input and phrases on which the STI system has been trained, and can extend the general applicability of the system.

The system described herein can also extend the usability of the STI system wherein a text representation of the acoustic input might be required, for example, dictating a text message, taking meeting notes, etc. The combination described herein adds to the STI system by providing the ability to automatically learn new acoustic inputs and phrases.

The present disclosure is targeted at developing VUIs allowing a user to control various devices in home, cars, mobile phones, virtual reality etc. However, it can be appreciated that the present disclosure does not necessarily rely on text to achieve this result.

In one aspect, a method of implementing a VUI speech recognition system is provided, wherein the VUI is capable of learning to recognize new commands and phrases from examples provided by an end user, provide a high degree of recognition accuracy for such learned phrases and other non-learned phrases, and automatically learn new commands without requiring active input or feedback from the user.

The VUI in at least one implementation can include:

(a) a text-independent STI speech recognition system that is capable of learning by examples provided by the user to map an input acoustic signal to one of the possible target outcomes intended by the user, where the system performs acoustic modeling using one or more of DTW, DNN, RNN, CNN, NMF, GMM, HMM, support vector machine (SVM), histogram of acoustic co-occurrence (HAC) etc.; and may produce a level of confidence along with the decision or mapping. The examples can further include: (i) an acoustic input that may be in the form of a speech signal; and (ii) a semantic input relating to the intention of the user associated with the acoustic input, where the semantic input may be provided using any one or more of buttons, a keyboard, a mouse with associated graphical user interface (GUI), etc.

(b) a speech to text ASR optionally combined with a natural language processing (NLP) system to either map the input acoustic signal to one of the target outcomes intended by the user with or without a level of confidence for this mapping, or to transcribe the input acoustic signal to text in the desired language of the user, wherein such a speech recognition system can be pre-trained using any one or more of acoustic modeling techniques, such as HMMs, GMMs, DNNs, CNN, RNNs, LSTM, GRU, HAC, etc.

(c) a decision fusion module capable of taking the outputs of the STI and the ASR systems as inputs and performing any one or more of the following: (i) making a final decision about the intended action by the user with or without taking confidence scores of either or both of the systems into account; (ii) using the final decision along with the acoustic input signal to re-train the STI system in order to increase recognition performance of the STI system; and (iii) if no good intended action is recognized then producing text in the intended language of the user corresponding to the acoustic input by the user.

In another aspect, the following describes a system and method for implementing a high performing VUI system including an STI system, an ASR system, a decision confidence comparator, and a feedback module to add new commands to, and to retrain, the STI system.

The STI system can include one or more of DTW, DNN, CNN, RNN, NMF, GMM, HMM, SVMs, HAC, and produces either a set of semantic labels corresponding to one of the previously learned phrases as a recognition outcome with a measure of confidence, or an unrecognized status. The decision confidence comparator can include a mechanism to compare the output decision confidence of the STI system to a threshold, and decide to either keep the STI-recognized outcome or fall back to the ASR system for recognition The ASR system includes one or more acoustic models trained using any one or more of acoustic modeling techniques such as HMMs, GMMs, DNNs, RNNs, LSTM, GRU, HAC, etc., possibly combined with a NLP module to map the recognized text to one of the intended actions or outputs recognized text in the user's intended language for unrecognized commands. The feedback module includes processes to add new knowledge and commands to the STI system by taking into account the acoustic input and output of the ASR system.

In yet another aspect, the following describes a method for producing a high performing VUI system that includes an STI system, an ASR system, a decision fusing system, and a feedback module to add new commands to, and retrain, the STI system.

The STI system can include one or more of DTW, DNN, CNN, RNN, NMF, GMM, HMM, SVMs, HAC, and produces either a set of semantic labels corresponding to one of the previously learned phrases as a recognition outcome or an unrecognized status.

The ASR system includes one or more acoustic models trained using any one or more acoustic modeling techniques such as HMMs, GMMs, DNNs, CNNs, RNNs, LSTM, HAC, GRU, etc., possibly combined with an NLP module to map the recognized text to one of the intended actions or outputs of recognized text in the user's intended language for unrecognized commands.

The decision fusion module includes a mechanism to deduce the most probable outcome based on fusing outcomes of the STI and ASR systems, and the feedback module includes processes to add new knowledge to the STI system by taking into account the acoustic input and output of the ASR system.

In yet another aspect, a method for speech recognition for a VUI is provided, wherein the method is implemented by a system comprising at least one processor. Such a method includes:

(a) obtaining an acoustic signal comprising speech, and processing the acoustic signal to: (i) divide the acoustic signal into a plurality of speech frames; (ii) transform the acoustic signal or the derived frames to a frequency domain representation; (iii) further divide the frequency representation into a plurality of bands; and (iv) provide the frequency bands to a number of filters and post-processing systems in order to obtain speech features, wherein the post-processing systems may include processes for performing one or more of log compression, discrete cosine transform, mean and variance normalization;

(b) providing the speech features to a text-independent acoustic modeling technique, which may include one or more of GMM, DNN, NMF, SVM, RNN, CNN, HMM, HAC;

(c) providing the speech features to a speech to text acoustic modeling technique, which may include one or more of GMM, DNN, NMF, SVM, RNN, CNN, HMM, HAC;

(d) making a final decision based on the outcomes of (b) and (c), with step (d) optionally performing a pre-determined action based on the outcome of (d); and (e) re-training the STI system to learn the new command, if the acoustic phrase or command does not exist in a database of known command.

Turning now to the figures, FIG. 1 displays a flowchart of the speech recognition method that combines a text-independent STI and a speech to text based ASR system, to produce improved recognition accuracy for a VUI system that can be used to control one or more devices or equipment.

The exemplary system 100 seen in FIG. 1 includes a feature extraction module 102, a user demonstration and feedback module 105, an STI module 107, a speech to text ASR module 109, a decision fusion module 111, and a feedback-based learning module 114. The combined system has multiple advantages over individual systems. These include the ability to fuse results from the two systems to provide overall improved recognition accuracy, and an ability to automatically train the text independent speech recognition system without requiring active feedback from the end-user.

In the feature extraction module 102, an acoustic input signal 101 is filtered and processed to extract one or more parametric digital representations (also referred herein to as "feature vectors 103") using one or more techniques such as, for example, Fourier analysis, Mel filter bank, cepstral processing, convolutional neural network, and linear predictive coding. This extraction can occur at frames of 25 ms each, for example.

The user demonstration and feedback module 105 is an optional component that provides a mechanism for the user to provide feedback or input regarding the intent or desired action associated with acoustic signal 101. The demonstration module 105 may be a touch screen, a button on a computing device, a menu scanning device, or a physical device such as an electric switch, etc. The demonstration module 105 converts the user demonstration 104 to a semantic representation 106, and can be used to conduct learning or training for the system 100. The semantic representation 106 could be a vector of 1 s and 0 s representing a presence and an absence, respectively, of particular keywords that might be present in the acoustic input 101.

The semantic representation 106 can be represented by a fixed-length vector in which entries represent the presence or absence of a vocal expression referring to the relevant semantics that users refer to when they control a device by voice. Using the demonstration module 105 along with the acoustic input 101, the user can train the STI module 107 to map a particular acoustic input to a particular semantic representation or intent. Using the demonstration module 105, a user can also choose to provide feedback while using the speech recognition system 100 whether the action is performed after determining whether or not the acoustic signal 101 is correct or incorrect. In cases where the output would be incorrect, the user, in addition, can indicate the correct action. As a result, the system 100 learns the vocabulary of the user. In other words, the user teaches the system 100 a vocabulary by which to control the system 100.

In the STI module 107, during training, feature vectors 103 and semantic representations 106 are processed to train an STI model that can correlate feature vectors from an utterance with a semantic representation corresponding to phrases representing possible actions or intents of the user. During usage, the STI module 107 processes feature vectors 103 and maps an utterance to one of the pre-defined "intents" that may correspond to phrases representing possible actions that the user might want to be performed for a given acoustic input 101. Alternatively, the STI module 107 can return a "NULL" response if the input acoustic signal 101 is predicted not to be one of the pre-defined intents. Therefore, the output of the STI module 107 is herein referred to as a "predicted intent 108".

The predicted intent 108 can also include a measure of confidence characterizing how confident the STI module 107 is with its prediction. The STI module 107 can be implemented using one or more of techniques such as neural networks including deep, recurrent and convolutional networks, DTW, auto-encoders, GMM, HAC, HMM, SVM, and NMF. The STI module 107 can either be pre-trained on a separate device, or trained by the user on the same device by using a demonstration module 105. The STI module 107 can also be situated on a different device and communicate to the user device using a server client paradigm, for example, the STI module 107 could be situated on a cloud computing server. An example of a configuration for the STI module 107 is described in co-pending PCT Patent Application No. PCT/EP2015/075721 filed on Nov. 4, 2015, the contents of which are incorporated herein by reference.

In the speech to text ASR module 109, feature vectors 103 from the feature extraction module 102 are processed and mapped to a text string, herein referred to as "predicted text 110". The ASR module 109 can be implemented using one or more of techniques such as DNNs including RNNs and CNNs, auto-encoders, restricted Boltzmann machines (RBMs), GMMs, and HMMs. The ASR module 109 can either be pre-trained on a separate device, or trained on the same device. Alternatively, the ASR module 109 can be situated on a different device and communicate to the user device using a client-server paradigm, for example, the ASR module 109 could be situated on a cloud computing server.

In the decision fusion module 111, the predicted intent 108 from the STI module 107, and predicted text 110 from the ASR module 109 are fused to make a final decision in the form of the desired user intent or action 112. The fusion to obtain the final decision can be made in a number of ways. For example, the decision fusion module 111 can take into account a confidence in the predicted intent 108 and predicted text 110 to choose the outcome of the more confident system as the final output. Alternatively, the decision fusion module 111 can also utilize a decision matrix that performs additional computations to decide which of the predicted intent 108 or predicted text 109 to choose.

The decision fusion module 111 can also provide a semantic representation 113 of the final decision to the feedback learning module 111, or a text output 115 when no semantic representation can be derived. In case neither of the STI module 107 and the ASR module 109 are able to successfully recognize the acoustic input 101, the decision fusion module 111 can return a repeat request, suggested recognition, or request the user to confirm the input 101. A number of different metrics can be used to define the success criteria(on) of a recognition, such as a confidence score, confusion between different predictions, entropy or variance of the predictions, a background model, a classifier based on a background model, etc. Additional details on exemplary configurations for the decision fusion module 110 are given in FIGS. 2 to 6 described below.

In the feedback learning module 114, semantic representations 113 from the decision fusion module 111 are used to optionally provide additional learning to the STI module 107. The semantic representation 113 could be a vector of 1 s and 0 s representing the presence and absence, respectively, of particular keywords that might be present in the acoustic input 101. This additional learning may result in retraining the models within the STI module 107 without requiring active user involvement for training. The semantic representation 113 may be represented by a fixed-length vector in which entries represent the presence or absence of a vocal expression referring to the relevant semantics that users refer to when they control a device by voice.

Figure 2:
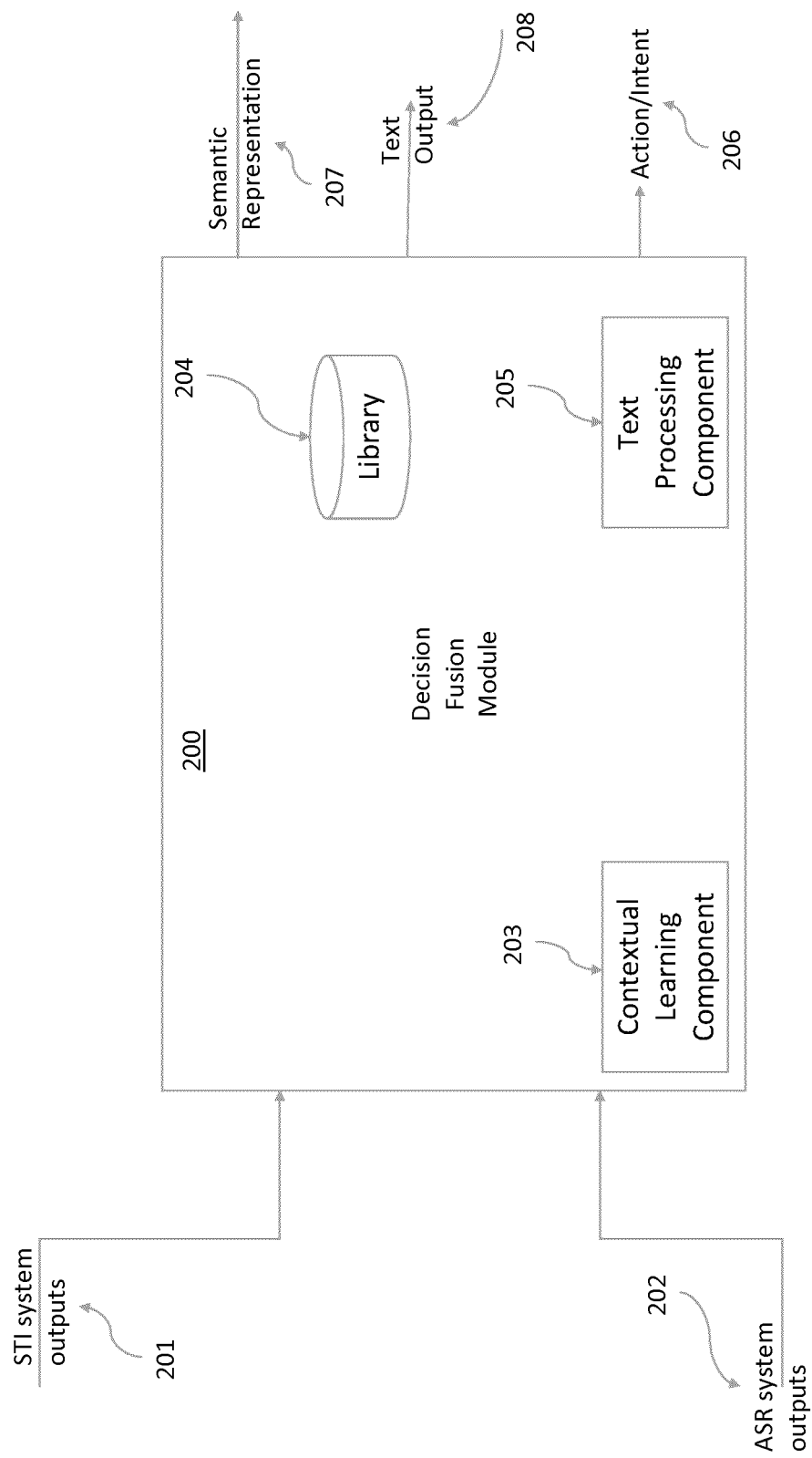
FIG. 2 is a block diagram of an example of an architecture incorporating a decision fusion module used to fuse the outputs of speech to intent (STI) and ASR systems.

FIG. 2 illustrates the decision fusion module 200 as a general example implementation of the decision fusion module 110 shown in FIG. 1. Some of the internal components of decision fusion module 200 are illustrated, including: a contextual learning component 203 to incorporate contextual information in order to improve the accuracy of the system 100; a library 204, which stores a representation of the current knowledge that the system has; and a text processing component 205 to process the text transcription (predicted text 110) of an acoustic input 101 and to extract the meaning or the intent of the speaker.

The decision fusion module 200 outputs the final decision of the system 100 in the form of the desired intent or action 206, a semantic representation 207 of the decoded output, and optionally a text output 208. The semantic representation 207 can be used to retrain the STI system 107 through the feedback module 114 of the system 100 (see also FIG. 1).

The contextual learning component 203 helps the decision fusion module 200 to make more accurate decisions by incorporating contextual information for an acoustic input 101. Some examples of contextual information include time of day, background acoustics, previously spoken utterances, etc. It can be appreciated that other examples of contextual information are possible. For example, if the system 100 is used in a vehicle, the contextual information may include information from one or more of sensors of the vehicle such as speed, status of radio, status of the music player, status of a connected device (mobile phone etc.), position of nearby vehicles, geo-location of the vehicle etc. The contextual learning component 203 uses this information during both training and testing to make the system 100 more likely to make a particular decision in a particular state.

The library 204 contains a representation of the knowledge about the possible acoustic inputs that the system 100 should be able to recognize (map to a semantic output) at a given time or learn in the future. It can be appreciated that the library 204 may contain information or knowledge corresponding to acoustic inputs that the system does not know yet and will only learn in the future. The library 204 can also be extended at any point by the system 100 or by the user by adding extra knowledge about previously unknown acoustic inputs. The library 204 can be stored in the form of any data structure or memory element or component and can be located in any accessible location. That is, the library 204 does not necessarily need to be contained within the decision fusion module 200.

The text processing component 205 processes the ASR system output 202 to derive a meaning and a semantic representation of the user's intent from the spoken utterance. In other words, in the text processing component 205, the ASR system output 202 is mapped to one of the pre-defined "intents" that may correspond to commands or phrases representing possible actions that the user might want to perform for a given acoustic input 101. The text processing module 205 may be implemented using an NLP system. Alternatively, if a semantic representation cannot be derived, the text processing component 205 allows the decision fusion module 200 to output the ASR system output 202 as a text transcription of the acoustic signal 101. The text processing component 205 may be implemented using one or more neural networks including DNN, RNN and CNN, parts of speech tagging, word2vec, text-parsing. The NLP component 107 can either be pre-trained on a separate device, or trained on the same device. Alternatively, the text processing component 205 can be situated on a different device and communicate to the user device using a server client paradigm, for example, the text processing component 205 could be situated on a cloud computing server.

The decision fusion module 200 can utilize a number of different algorithms to reach its final output by taking into account the STI system output 201 and the ASR system output 202. Some examples are shown in FIGS. 3 to 6, described below. However, it will be appreciated that these examples are illustrative and various other implementations are possible.

Figure 3:
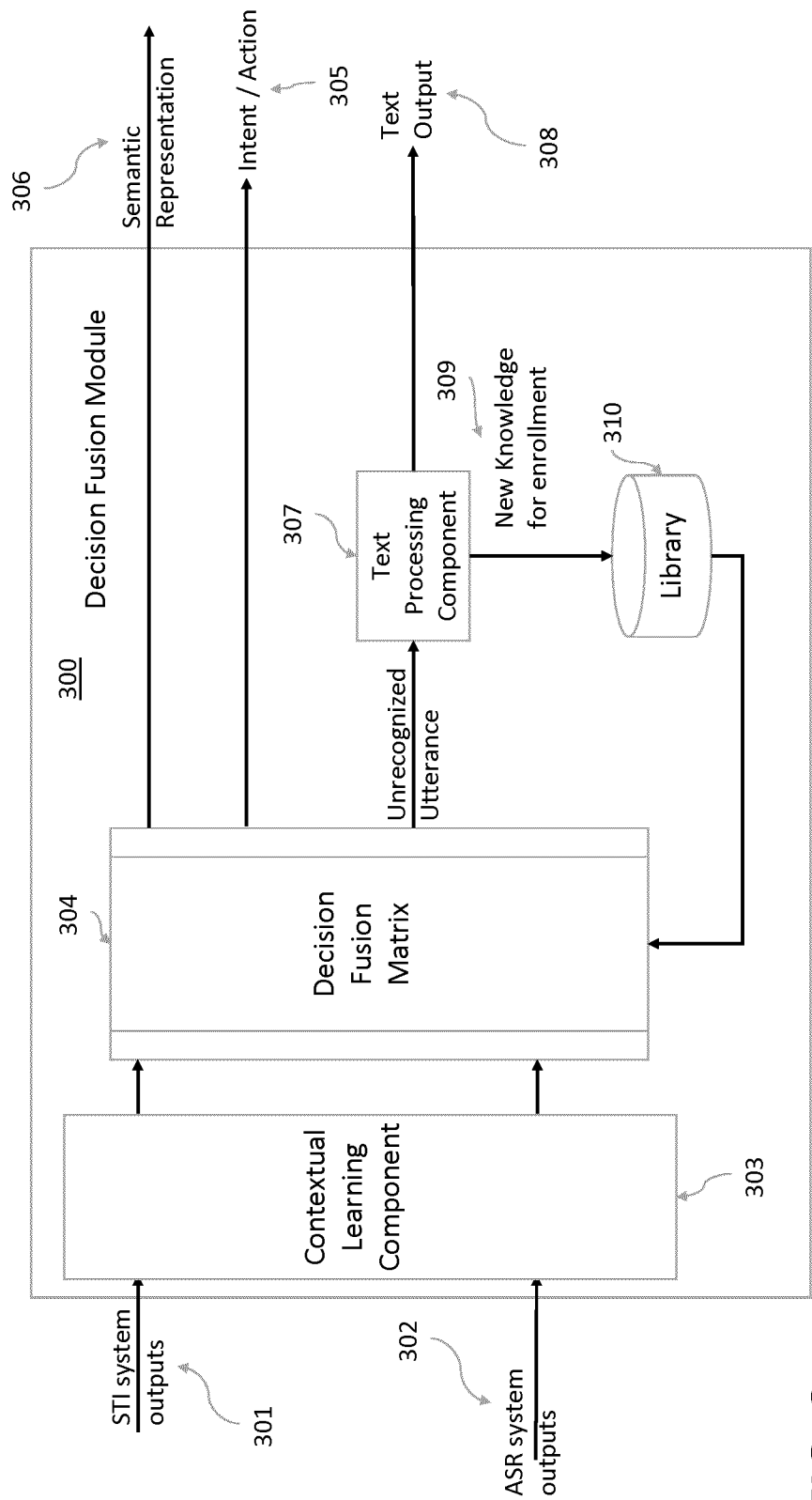
FIG. 3 is a detailed flowchart illustrating exemplary computer executable instructions for processing inside the decision fusion module to integrate the outcomes of STI and ASR systems and performing additional learning of the STI system without requiring explicit user feedback.

FIG. 3 provides an example flowchart for another decision fusion module 300 implementation. The decision fusion module 300 takes as inputs, an STI system output 301 and an ASR system output 302, and processes these inputs using a contextual learning component 303 to incorporate contextual information, if any. The outputs of the contextual learning process are then processed using a decision fusion matrix 304, which produces an intent or action of the user 305, and a semantic representation of the recognition 306 as outputs of the decision fusion module 300.

The Intent 305 can be used to control one or more devices, and the semantic representation 306 can be used to re-train or add extra knowledge to the STI 107 of the system 100. Alternatively, if the decision fusion matrix 304 is not able to recognize a given utterance, the text output of the ASR system is processed through a text processing component 307. The text processing component 307 can be implemented using an NLP system. The text processing component 307 may also derive a semantic representation from the input text use that is additional or new knowledge 309 to enroll into a library 310.

The library 310 holds a representation of the current knowledge of the system. Upon enrolling new knowledge, the library 310 feeds into the decision fusion matrix 304 to provide the ability to recognize previously unrecognized acoustic inputs. The text processing component 307 may also provide a text output 308 if a semantic representation cannot be derived.

Figure 4:
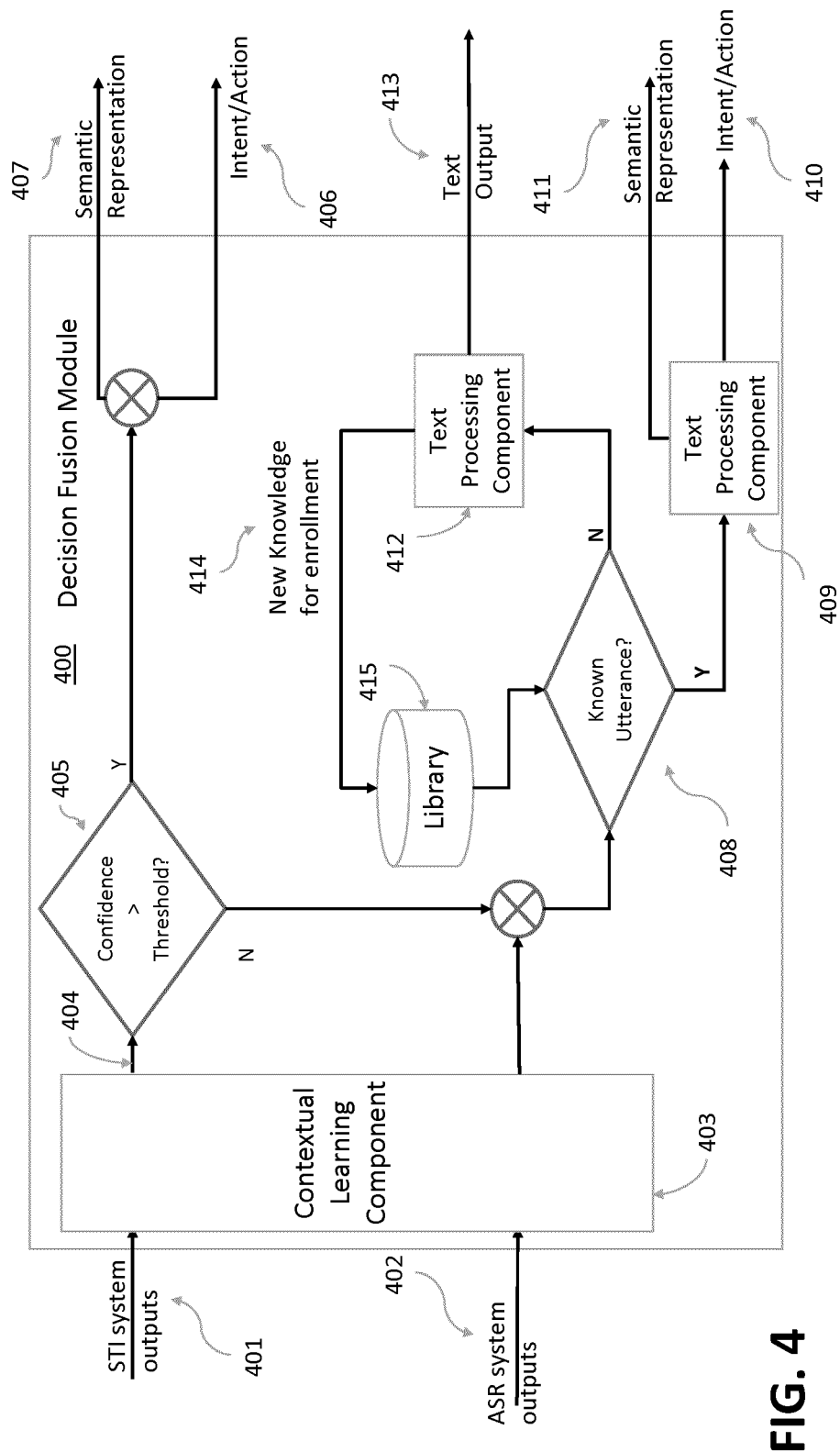
FIG. 4 is a detailed flowchart illustrating exemplary computer executable instructions for processing the outcomes of STI and ASR systems while also taking into account the confidence of prediction and performing additional learning of the STI system without requiring explicit user feedback.

FIG. 4 provides an example flowchart for another decision fusion module 400 implementation. The decision fusion module 400 in this example receives the STI system outputs 401, which contains both the predicted action by the STI system 107 and a confidence score for the prediction. The STI system outputs 401 are processed using a contextual learning component 403 to improve the predictions, by taking into account any available contextual information. The confidence score of the improved outputs 404 is then compared to a threshold value in a comparator 405. The threshold may be a fixed pre-computed value or variable that can be determined at run-time and may adaptively change throughout system usage. If the predicted confidence in the outputs 404 is above the threshold, the decision fusion module 400 outputs the predicted intent or action 406 for the acoustic input 101, and a semantic representation 407 of the same. The semantic representation 407 can be used by the feedback learning module 114 of system 100 to retrain the STI module 107.

Alternatively, if the confidence score of the prediction in the outputs 404 is below the threshold, the decision fusion module 400 can use the ASR system outputs 402 to make a prediction about the user's intended action. For this purpose, the ASR system outputs 402 are processed through a contextual learning component 403, to incorporate any available contextual information, and the outputs are compared against a set of knowledge contained in a library 415 using a comparator 408, to decide whether or not the acoustic input corresponds to a previously seen piece of knowledge.

If the comparator 408 returns a positive, the outputs are processed through a text processing component 409 that outputs an intent or action 410 corresponding to acoustic input 101 and a semantic representation 411 of the same. The intent or action 410 can be used to control one or more devices, and the semantic representation 411 can be used to retrain the STI module 107. Alternatively, if the comparator 408 returns a negative, the outputs are processed through a text processing component 412 that outputs text 413 as a transcription of the acoustic input 101.

The text processing component 412 may also derive a semantic presentation from input text use that is additional or new knowledge 414 to enroll into the library 415. Both the text processing component 409 and the text processing component 412 may be implemented using one or more of neural networks including DNN, RNN and CNN, parts of speech tagging, word2vec, text-parsing, etc. Furthermore, components 409 and 412 may also be implemented as a single module that serves both purposes described herein.

Figure 5:
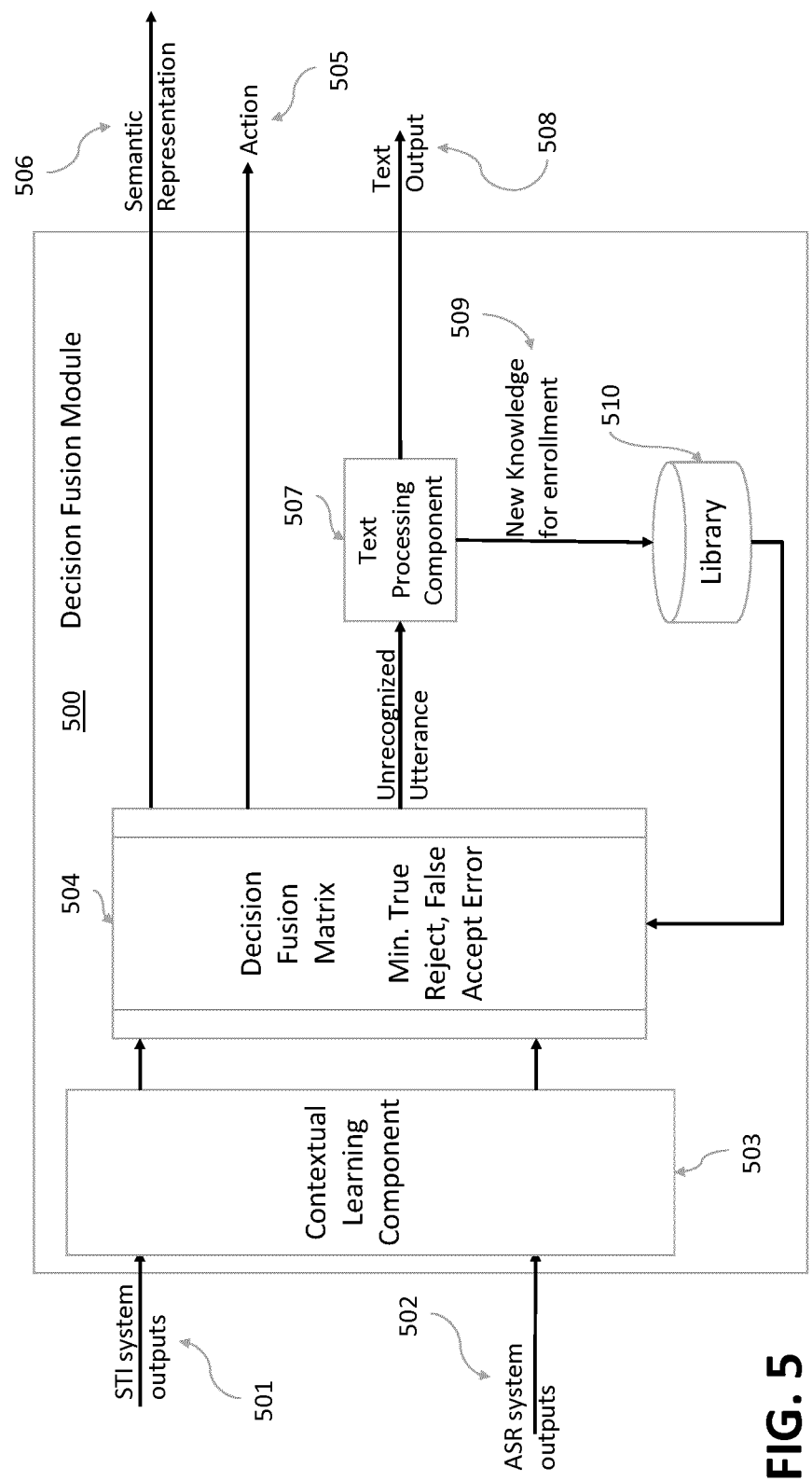
FIG. 5 is a detailed flowchart illustrating exemplary computer executable instructions for processing speech to map semantic frames to intents or actions when the goal is to minimize the false accept rate using a decision fusion module that takes into account the outcomes of STI and ASR systems and performing additional learning of the STI system without requiring explicit user feedback.

FIG. 5 provides an example flowchart for another decision fusion module 500 implementation. When compared to the module 400 shown in FIG. 4, the decision fusion module 500 does not use a threshold measure to decide between the output of the STI system 107 and the ASR system 109. Rather, a decision fusion matrix 504 is used which takes both the STI system outputs 501 and the ASR system outputs 502 as inputs, and makes a final decision by fusing the outputs based on a criterion to minimize a false acceptance error. Here, the false acceptance error refers to errors which can result when the system 100 accepts previously unseen inputs as one of the seen inputs and maps those inputs to one of the predefined semantic representations. It can be appreciated that minimizing a false acceptance rate is one criterion that can lead towards a desired optimization. Other criteria that can be used, include equal error rate (EER), Detection Cost Function (DCF), etc.

Figure 6:
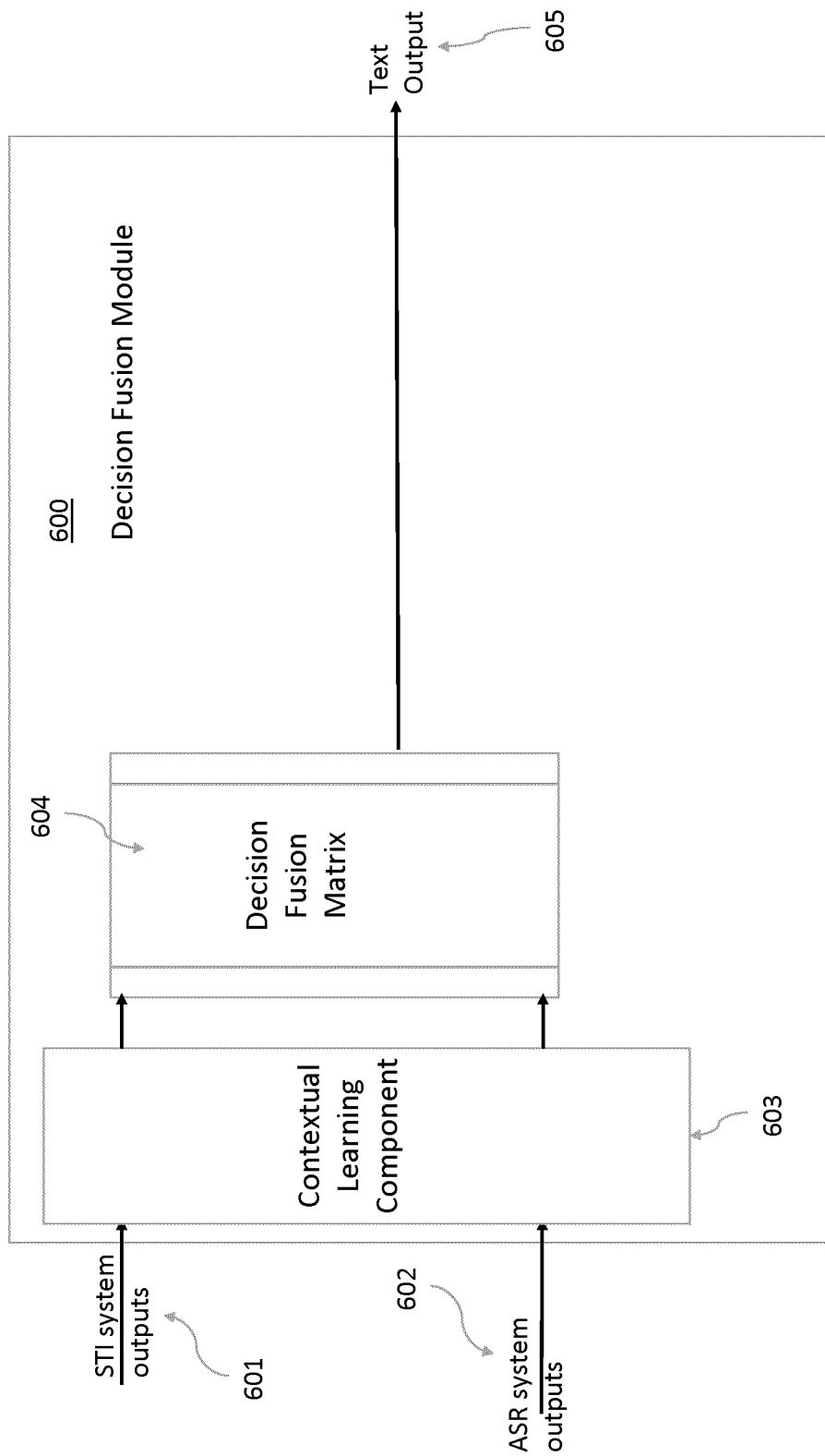
FIG. 6 is a flow chart illustrating exemplary computer executable instructions for generating a text output from acoustic input.

FIG. 6 provides an example flowchart for another decision fusion module 600 implementation. The decision fusion module 600 applies to the scenarios where an intent or action output may not be desirable and only a text output may be desirable. An example scenario is when a user wants to send a text message to a friend 'X', the user asks the VUI, 'text my friend X. I will be ten minutes late'. In this example, the VUI system 100 processes the acoustic part 'text my friend X' using one or more of the embodiments described in FIG. 1 to FIG. 5 and opens up the user's chosen text messenger. The decision fusion module 600, using a contextual learning component 603, determines that the remaining acoustic part requires a text transcription. Having determined this, the decision fusion module 600 uses only the ASR system's text output 602 to transcribe the remaining acoustic part 'I will be ten minutes late', into a text message 605.

From the above, it can be seen that the system 100 is configured to process input acoustic signals using the STI and ASR systems 107, 109 and can choose either one or a combination of the outputs of these systems to produce an output. There are, as illustrated above, various ways in which to generate such an input. For example, as shown in FIG. 4, only the output of the STI system 107 can be used and, if the confidence is below a predetermined threshold, fallback to the output of the ASR system 109 and use its output to make a better decision. In another example, such a threshold can be ignored or otherwise not relied upon and a combination of the STI and ASR systems 107, 109 are used to make a more educated guess. Such an educated guess can be made in various ways, using the decision fusion matrix 304, 504 as shown in FIGS. 3 and 5. In yet another example, the user can instruct the system 100 in a way that the next command will require text as shown in FIG. 6 (e.g., "Send a text to Tom", after which the user dictates the content of the text). The decision fusion module 111 can also utilize the context of the system to make a better decision, as discussed above. In yet another example, some automated learning of the STI system 107 from the ASR system 109 can be involved (e.g., if the STI system 107 fails but the ASR system succeeds (based on some metric), the output of the ASR system 109 can be used to teach the STI system 107 for detecting that phrase in the future). In yet another example, the user can input commands that neither the STI system 107 nor the ASR system 109 understands, but using the text processing component 205, the input can be detected as a potential command. Such a command can also be used to retrain the STI system 107 so that it is recognized in the future.

As can also be appreciated from the above, there are various applications of the principles and systems described herein. Some example applications, without limitation, are: use in a vehicle; use in a home—both in different appliances and as a central hub to control devices/parts of home (home automation); use in computers and mobile devices—to control interface as well as control various apps (devices may include computers, laptops, smartphones, tablets and wearables, etc.); use in virtual reality based systems; in assistive devices for people with disability or for people in distress (e.g. elderly people falling and not able to stand up); in (educational) toys and games; in robots for home as well as industry; for pilots or train drivers in a cockpit or heavy machine operators; in healthcare: both as an interface for the doctors as well as for navigating health records; in healthcare: speech or communication (i.e. autism) impaired users; in a web-api based interface that can be integrated into apps by different developers; etc.

The above examples have been described with respect to particular embodiments and with reference to certain drawings, however, the principles described herein should not be limited thereto. The drawings described are only schematic and are non-limiting. In the drawings, the size of some of the elements may be exaggerated and not drawn on scale for illustrative purposes. The dimensions and the relative dimensions do not correspond to actual reductions required to practice the embodiments described herein.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the principles described herein, the only relevant components of the device are A and B.

Reference throughout this specification to "one embodiment" or "an embodiment" means that a particular feature, structure or characteristic described in connection with the embodiment is included in at least one described embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment. Furthermore, while some embodiments described herein include some but not other features included in other embodiments, combinations of features of different embodiments are meant to be within the scope of the principles described herein, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

Wherein in the embodiments described herein, reference is made to "deep learning techniques" reference may be made to one of a number of techniques based on deep neural networks. Examples of the deep learning technique may be multi-layer perceptions (MLP), DNNs, CNNs, RNNs, TDNNs, LSTM, GRUs, etc.

Wherein in embodiments described herein, reference is made to "self-taught" reference may be made to learning by demonstration. Wherein in embodiments described herein, reference is made to "action state" reference may be made to a semantic representation of an action.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any component of or related to the systems and modules described herein, etc., or accessible or connectable thereto. Any application or module herein described may be implemented using computer readable/executable instructions that may be stored or otherwise held by such computer readable media. Furthermore, an application and module maybe developed using a server client model in cloud infrastructure.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] L. R. Rabiner, "A tutorial on hidden Markov models and selected applications in speech recognition," *Proc. IEEE*, vol. 77, no. 2, pp. 257-286, 1989.

[2] L. R. Welch, "Hidden Markov Models and the Baum-Welch Algorithm," *IEEE Inf. Theory Soc. Newsl.*, vol. 53, no. 4, pp. 1,10-13, 2003.

[3] A. Senior, "Application of Pretrained Deep Neural Networks to Large Vocabulary Conversational Speech Recognition," 2012.

[4] N. Jaitly, P. Nguyen, A. Senior, and V. Vanhoucke, "An application of pretrained deep neural networks to large vocabulary conversational speech recognition," in *Interspeech*, 2012, no. Cd, pp. 3-6.

[5] V. S. Tomar and R. C. Rose, "Manifold regularized deep neural networks for automatic speech recognition," in *ASRU*, 2015.

[6] Y. Bengio and P. Lamblin, "Greedy layer-wise training of deep networks," in *Advances in Neural Information Processing Systems (NIPS)*, 2007, no. d.

[7] D. Yu, F. Seide, and G. Li, "Conversational speech transcription using context-dependent deep neural networks," in *Interspeech,* 2011, no. August, pp. 437-440.

[8] M. Bhargava and R. Rose, "Architectures for deep neural network based acoustic models defined over windowed speech waveforms," in *Interspeech* 2015, pp. 1-5.

[9] T. N. Sainath, B. Kingsbury, G. Saon, H. Soltau, A. Mohamed, G. Dahl, and B. Ramabhadran, "Deep Convolutional Neural Networks for Large-scale Speech Tasks," *Neural Networks,* 2012.

[10] H. Sak, A. Senior, K. Rao, and F. Beaufays, "Fast and Accurate Recurrent Neural Network Acoustic Models for Speech Recognition," *arXiv Prepr.,* 2015.

[11] A. Senior and I. Shafran, "Context Dependent Phone Models for Lstm Rnn Acoustic Modelling," *ICASSP, IEEE Int. Conf. Acoust. Speech Signal Process.—Proc.,* pp. 4585-4589, 2015.

[12] T. Sercu, C. Puhrsch, B. Kingsbury, and Y. LeCun, "Very Deep Multilingual Convolutional Neural Networks for LVCSR," *arXiv Prepr.,* pp. 2-6, 2015.

[13] T. N. Sainath, O. Vinyals, A. Senior, and H. Sak, "CONVOLUTIONAL, LONG SHORT-TERM MEMORY, FULLY CONNECTED DEEP NEURAL NETWORKS," 2015.

[14] A. Graves and N. Jaitly, "Towards End-To-End Speech Recognition with Recurrent Neural Networks," *ICML* 2014, vol. 32, no. 1, pp. 1764-1772, 2014.

[15] Jan Chorowski, Dzmitry Bandanau, Kyunghyun Cho, and Yoshua Bengio, "End-to-end Continuous Speech Recognition using Attention-based Recurrent NN: First Results," pp. 1-10, 2014.

[16] J. Chung, C. Gulcehre, K. Cho, and Y. Bengio, "Gated Feedback Recurrent Neural Networks," *arXiv Prepr.,* 2015.

[17] X. Huang, A. Acero, and H.-W. Hon, Spoken Language Processing, 1st ed. Prentice Hall PTR, 2001.

[18] G. Chen, C. Parada, and T. N. Sainath, "Query-by-example keyword spotting using Long Short Term Memory Networks," *Int. Conf. Acoust. Speech, Signal Process.,* pp. 1-5, 2015.

[19] J. Driesen and H. Vadn hamme, "Modelling vocabulary acquisition, adaptation and generalization in infants using adaptive Bayesian PLSA," *Neurocomputing,* vol. 74, no. 11, pp. 1874-1882, 2011.

[20] D. D. Lee and H. S. Seung, "Learning the parts of objects by non-negative matrix factorization.," *Nature,* vol. 401, no. 6755, pp. 788-91, 1999.

[21] J. Driessen, "Discovering Words in Speech using Matrix Factorization," KUL, 2012.

[22] B. Ons, J. F. Gemmeke, and H. Van hamme, "The self-taught vocal interface," *EURASIP J. Audio, Speech, Music Process.,* vol. 2014, no. 1, p. 43, 2014.

[23] B. Ons, "The Self-taught Speech Interface," KUL, 2015.

[24] B. Ons, J. F. Gemmeke, and H. Van hamme, "Fast vocabulary acquisition in an NMF-based self-learning vocal user interface," *Comput. Speech Lang.,* vol. 28, no. 4, pp. 997-1017, 2014.

[25] L. Broekx, K. Dreesen, J. F. Gemmeke, and H. Van hamme, "Comparing and combining classifiers for self-taught vocal interfaces," *Proc. SLPAT* 2013, pp. 1-8, 2013.

The invention claimed is:

1. A method for performing speech recognition, the method comprising:
    obtaining an input acoustic signal;
    providing the input acoustic signal to each of:
        a text-independent speech-to-intent (STI) system to determine a predicted intent; and
        a speech-to-text automatic speech recognition (ASR) system to determine predicted text; and
    using the predicted intent the predicted text and prediction confidence scores corresponding to each of the text-independent STI and ASR systems to map the acoustic signal to a desired user intent or action.

2. The method of claim 1, further comprising generating a semantic representation and providing the semantic representation as feedback for subsequent training of the text-independent STI system.

3. The method of claim 2, further comprising providing a text output when no semantic representation can be derived.

4. The method of claim 1, further comprising determining and using a context of the system when the acoustic signal is received from a user.

5. The method of claim 1, further comprising performing the desired user intent or action when the mapping is successful.

6. The method of claim 1, further comprising providing a transcription to another application when the transcription is intended by the user.

7. The method of claim 1, further comprising using a decision fusion matrix to integrate the predicted intent and the predicted text, to output a most likely semantic output.

8. The method of claim 7, wherein the context includes any one of more of:
    an identity of the speaker, a previous conversation history, a state of system, a time of day, a state and history of one or more connected devices or applications, background noise, a state and history of one or more connected sensors, a speed of a vehicle.

9. The method of claim 7, further comprising using a feedback loop to enroll one or more new commands into the text-independent STI system based on the output of the ASR system and the decision matrix.

10. The method of claim 2, wherein the semantic representations are generated from automatically analyzing outputs of the ASR system, associated with the input acoustic signal.

11. The method of claim 1, wherein the input acoustic signal is a voice signal.

12. The method of claim 1, wherein the text-independent STI system is configured for decoding the input acoustic signal into useful semantic representations using one or more of non-negative matrix factorization (NMF), deep neural networks (DNN), recurrent neural networks (RNN) including long-short term memory (LSTM) or gated recurrent units (GRU), convolutional neural networks (CNN), hidden Markov models (HMM), histogram of acoustic co-occurrences (HAG), or auto-encoders (AE).

13. The method of claim 1, wherein the ASR module is configured for decoding the input acoustic signal into useful text representations using one or more of nonnegative matrix factorization (NMF), deep neural networks (DNN), recurrent neural networks (RNN) including long-short term memory (LSTM) or gated recurrent units (GRU), convolutional neural networks (CNN), hidden Markov models (HMM), natural language processing (NLP), natural language understanding (NLU), and auto-encoders (AE).

14. The method of claim 1, further comprising using semantic concepts corresponding to relevant semantics that a user refers to when controlling or addressing a device or object by voice using a vocal user interface (VUI).

15. The method of claim 1, further comprising learning new synonyms referring to same actions, or new acoustic words corresponding to new actions or intents, and using the new synonyms or new acoustic words to adapt a model, a library, or both the model and the library.

16. The method of claim 2, wherein the semantic representations are generated from user actions performed on an alternate non-vocal user interface.

17. The method of claim 16, wherein the alternative non-vocal user interface includes any one or more of buttons, a touchscreen, a keyboard, a mouse with associated graphical user interface (GUI).

18. The method of claim 2, wherein the semantic representations are predefined and a vector is composed in which entries represent a presence or absence in the input acoustic signal referring to one of the predefined semantic representations.

19. The method of claim 18, wherein the vector is a fixed length vector.

\* \* \* \* \*